March 2, 1926.

H. KLEINMAN

SEWED SKIN

Filed Sept. 15, 1924

1,575,345

Inventor:
Hyman Kleinman,
By Byrne Townsend & Brickenstein,
Attorneys.

Patented Mar. 2, 1926.

1,575,345

UNITED STATES PATENT OFFICE.

HYMAN KLEINMAN, OF LOUISVILLE, KENTUCKY.

SEWED SKIN.

Application filed September 15, 1924. Serial No. 737,849.

*To all whom it may concern:*

Be it known that I, HYMAN KLEINMAN, a citizen of the United States, residing at Louisville, in the county of Jefferson and State of Kentucky, have invented certain new and useful Improvements in Sewed Skin, of which the following is a specification.

The present invention relates to the preparation of a sewed skin for use in the manufacture of fur coats and the like, and to a process of producing the same. The process is particularly applicable to the preparation of Hudson seal or dyed muskrat skins, but it is obvious that the process may be used in connection with other skins, hides or furs.

At the present time, it is customary to trim a skin by making obtuse, angled cuts at the four corners of the skin, thus leaving outwardly tapering projections at the head and tail. The corners of the skin are then removed by diagonal cuts extending from and in alignment with the side edges of the head and tail portions. These four triangular sections are then displaced to bring their outer edges into alignment with the respective outer edges of the head and tail portions and are then sewed to the body of the skin. The sewed skins must be trimmed again before assembling to form a garment as they are not rectangular in shape. If the deeply indented side edges and the top and bottom edges are trimmed to form a rectangle, a considerable portion of the skin is lost. If the skin is not trimmed to a true rectangle, portions of the skin must be stretched when it is joined to other skins, thus producing a fur of inferior quality.

An object of the present invention is to provide a process of cutting and sewing a skin which will result in a sewed skin of larger size and of better quality than could be produced by former processes. A further object of the invention is to provide a process requiring less cutting and sewing than was necessary in the former processes. The invention also contemplates the production of a sewed skin and of a trimmed skin which are of novel design.

These and other objects of the invention will be apparent from the following specification, when taken in connection with the accompanying drawings, in which—

Figure 1:
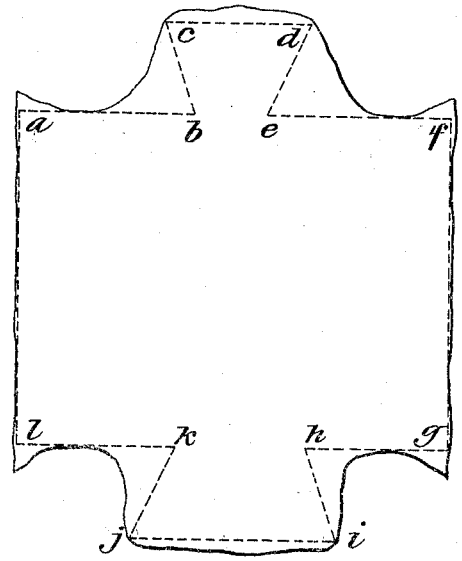
Fig. 1 is a plan view of a skin, and showing, in dotted line, the shape to which the skin is to be trimmed.

The rough skins which are to be made up into a garment will be of the general shape shown in Fig. 1. The skin is cut along the lines $ab$, $bc$, etc., to provide a substantially rectangular body portion $a\ f\ g\ l$ and outwardly flaring portions $b\ c\ d\ e$ and $h\ i\ j\ k$ at the head and tail sections of the skin. The lines $bc$ and $hi$ are parts of the same straight line and the first cut is the diagonal cut $bh$, which divides the body of the skin into two parts by a line extending from the edge $bc$ of the portion $b\ c\ d\ e$ to the oppositely located edge $hi$ of the other projecting portion.

Figure 3:
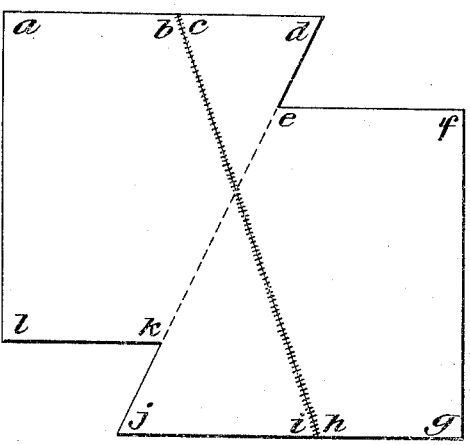
Fig. 3 is a plan view of a skin after the first seam has been stitched and showing the second line of division.

After severing the skin, the two parts are moved along the line of separation to bring the outer edge $cd$ of the portion $b\ c\ d\ e$ into alignment with the outer edge $ab$ of that part of the body portion to which the flared portion $b\ c\ d\ e$ is not then attached. The parts are then sewed along the line $bc$—$hi$, which results in a sewed skin as shown in Fig. 3. The trimming lines $de$ and $kj$ which were originally parallel to each other, were so spaced that they come into alignment when the skin is sewed together after the first cut. The skin is again separated by a diagonal cut $ek$ which joins the exposed edges $de$ and $jk$ of the two flared portions. The severed parts are shifted to bring the respective outer edges of the parts into alignment and are sewed together along the line $de$—$jk$.

Figure 2:
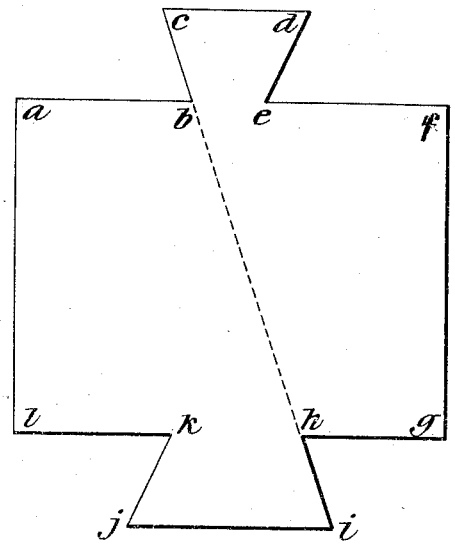
Fig. 2 is a plan view of a trimmed skin upon which the first line of division is shown in dotted line.

When the two flared portions are of equal altitude the finished skin will be in the form of a rectangle $a\ f\ g\ l$ which may be sewed to other and similarly prepared skins to form a garment. It will be noted that but two cuts and two seams are required and that the sewed skin need not be trimmed or stretched before sewing it to other skins. Although the trimmed skin as illustrated in Fig. 2 is of less area than a skin which would have been trimmed out according to the old process, the finished skin which I produce has an area from 10 to 15% greater than the finished skins which were previously obtained. The sewed skin which I produce is not only of greater area but is of better quality since the deep trimming at the head and tail sections removes portions of relatively poor quality which were retained by the old processes.

It will be evident to those skilled in the art that the preliminary trimming of a rough hide is not essential in practicing my invention since the steps of cutting and sewing may precede the step of trimming. My invention contemplates the consolidation of the sound portions of a hide by forming, in effect, two triangles or wedges which have for their respective bases the head and tail portions of the hide, displacing the wedges towards each other to separate the main or body portions of the hide, and to bring the outer limits of the sound sections of the head and tail portions into substantial lateral alignment with the sound sections of the body of the hide, and sewing the parts together.

Figure 4:
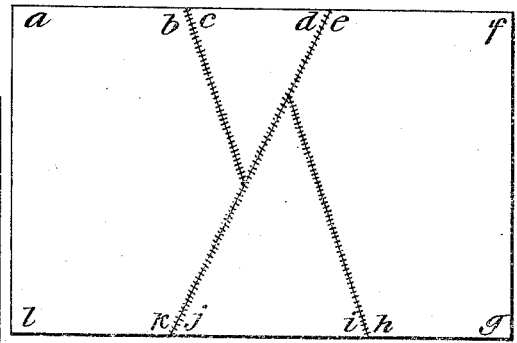
Fig. 4 is a plan view of the finished skin.

While I have described the most efficient method of producing the skin illustrated in Fig. 4, it will be apparent that the same result could be obtained by cutting the skin of Fig. 2 along line $bh$, and then cutting off the two triangular sections by extending lines $de$ and $jk$, respectively, to meet the line $bh$. This modification of my process makes it necessary to sew four separate pieces together and therefore is less desirable than the repeated steps of cutting and sewing which are described above.

It is also apparent that the skins as shown in Fig. 3 might be assembled in a garment without first reducing them to the rectangular form shown in Fig. 4.

It is to be understood that these and other modifications or changes may be made without departing from the spirit of my invention as expressed in the following claims.

I claim:—

1. A process of cutting and sewing a skin comprising trimming the same to form a body portion having outwardly flaring head and tail portions projecting therefrom, dividing the body portion by a diagonal cut extending from one edge of one flaring portion to the oppositely disposed edge of the other flaring portion, displacing the severed parts along the line of separation to bring the outer edge of one of said flaring portions into alignment with the adjacent outer edge of that part of the body portion to which said flaring portion is not attached, and sewing said parts together when in such position.

2. A process of cutting and sewing a skin comprising trimming the same to form a body portion having outwardly flaring head and tail portions projecting therefrom, dividing the body portion by a diagonal cut extending between oppositely disposed edges of the two flaring portions, sewing the severed parts together with the outer edges of the flaring portions in alignment with the outer edges of the respective parts of the body portion to which the said flaring portions are not attached, dividing the sewed skin by a diagonal cut extending between the other pair of oppositely disposed edges of the two flaring portions, and sewing the severed parts together with one pair of the respective adjacent edges of the parts in substantial alignment.

3. A trimmed skin comprising a substantially rectangular body portion and outwardly flaring head and tail portions projecting therefrom, one pair of the oppositely disposed edges of the projecting portions being in alignment and the other pair of oppositely disposed edges being parallel to each other.

4. A sewed skin substantially identical with one which may be formed by trimming a skin to provide a rectangular body portion having outwardly flaring head and tail portions, dividing said body portion by a cut extending between oppositely disposed edges of the two projecting portions, displacing said parts to bring adjacent outer edges into alignment, and sewing said parts together.

5. A sewed skin substantially identical with one which may be made by forming two triangular wedges having as their respective bases the head and tail portions of the hide, displacing the wedges towards each other to separate the body portions of the hide and to bring the outer limits of the sound sections of the head and tail portions into substantial lateral alignment with the sound sections of the body portions of the hide, and sewing the parts together when so arranged.

6. A sewed skin substantially identical with one which may be formed by trimming a skin to provide a rectangular body portion having outwardly flaring head and tail portions, dividing said body portion by a cut extending between oppositely disposed edges of the two projecting portions, displacing said parts to bring a pair of adjacent outer edges into alignment, sewing said parts together, dividing said sewed skin by a diagonal cut extending between the other pair of oppositely disposed faces of said projecting portions, and sewing said parts together with a pair of adjacent outer edges in alignment.

In testimony whereof, I affix my signature.

HYMAN KLEINMAN.